United States Patent [19]

Palmer

[11] 4,353,859

[45] Oct. 12, 1982

[54] METHOD FOR MAKING FITTINGS AND COUPLINGS

[76] Inventor: Sherwin Palmer, 1711 Woodslea Dr., Flint, Mich. 48508

[21] Appl. No.: 774,303

[22] Filed: Mar. 4, 1977

Related U.S. Application Data

[62] Division of Ser. No. 384,753, Aug. 1, 1973, abandoned.

[51] Int. Cl.³ .................... B29D 23/03; B29D 23/04; B29C 17/14
[52] U.S. Cl. ................... 264/506; 264/512; 264/515; 264/145; 264/157; 264/209.3; 264/210.1
[58] Field of Search .................. 29/421 R, 157 T; 264/90, 96, 138, 157, 92, 93, 94, 98, 296, 506, 512, 515, 145, 209.3, 210.1; 285/DIG. 4, 156, 214, 423, 390, 255

[56] References Cited

U.S. PATENT DOCUMENTS

| | | | |
|---|---|---|---|
| 1,324,850 | 12/1919 | Roberts | 264/90 |
| 1,543,506 | 6/1925 | Miller | 264/159 |
| 1,827,086 | 10/1931 | Hunter | 285/219 |
| 1,904,675 | 4/1933 | Boyer | 285/156 |
| 2,238,037 | 4/1941 | Cornel | 29/157 T |
| 2,790,994 | 5/1957 | Cardot et al. | 264/159 |
| 2,983,961 | 5/1961 | Titterton et al. | 264/98 |
| 2,986,847 | 6/1961 | Sato | 264/96 |
| 3,291,670 | 12/1966 | Usab | 264/98 |
| 3,300,556 | 1/1967 | Battenfeld et al. | 264/98 |
| 3,432,586 | 3/1969 | Stenger | 264/159 |
| 3,538,209 | 11/1970 | Hegler | 264/90 |
| 3,538,595 | 11/1970 | Barnes | 264/159 |
| 3,551,007 | 12/1970 | Martin et al. | 285/156 |
| 3,584,092 | 6/1971 | Alexandris | 264/92 |
| 3,793,421 | 2/1974 | Paubandt | 264/157 |
| 3,813,115 | 5/1974 | French | 285/355 |
| 3,825,288 | 7/1974 | Maroshak | 285/423 |
| 3,862,698 | 1/1975 | Hafele | 264/159 |
| 3,873,391 | 3/1975 | Plauka et al. | 285/156 |
| 3,891,733 | 6/1975 | Maroschak | 264/151 |

*Primary Examiner*—Willard E. Hoag
*Attorney, Agent, or Firm*—Irving M. Weiner; Pamela S. Burt; John L. Shortley

[57] ABSTRACT

Conduits, fittings, end closures, and couplers, particularly adapted for use as drain tile, are prepared by molding the items in a suitable mold with their respective ends closed. The ends can then be severed along cut lines directly molded, where desired. The items produced in accordance herewith are formed with helical threads to permit threaded interengagement therebetween.

3 Claims, 6 Drawing Figures

METHOD FOR MAKING FITTINGS AND COUPLINGS

This is a division of Application Ser. No. 384,753, filed Aug. 1, 1973 now abandoned.

BACKGROUND OF THE INVENTION

1. Field of the Invention:

The present invention relates to conduits, fittings and couplers. More particularly, the present invention relates to conduits, fittings and couplers which are interconnectable to define systems thereof. Even more particularly, the present invention pertains to plastic conduits, fittings and couplers which are interconnectable to define a plastic drain tile system.

2. Prior Art:

There has been developed heretofore a plurality of plastic pipes or conduits, as well as fittings and couplings therefor. Generally, such conduits, fittings and couplings are provided or configured to be interengageable through translatory motion therebetween coupled with interconnecting means provided on the items. With regard to plastic pipe adapted for use as drain tile, this is especially true. Typifying the prior art is the plastic drainage tubing sold under the registered trademark ADS which has corrugations.

Such drainage tubes use mating tabs and projections for interengagement of the drain tile system items, since they are not threadably connectable.

Other plastic pipe systems are provided with exotic grooving, ribbing and the like. See, inter alia, U.S. Pat. Nos. 3,440,822 and 3,538,207.

The prior art, as exemplified above, is deficient in effectuating engagement between designated items adapted for such purpose. Thus, a major advance in the art would be provided by plastic pipes or conduits, fittings and couplings which are interconnected with facility and which are of reduced manufacturing costs.

SUMMARY OF THE INVENTION

The present invention provides plastic pipes or conduits, fittings, couplings and the like, particularly adapted for use as a drainage system.

The plastic items hereof are provided with an inwardly directed helical thread. The helical thread permits threaded interengagement between the components.

The system components are manufactured from any suitable plastic by molding. The components are directly molded with closed ends having a cutting or severance line disposed proximate thereto. Thus, if the component is to have an open end, the end enclosure is cut off at the severance line by any suitable technique.

In manufacturing the components hereof they may have an aperture formed in the root portion of the thread to facilitate liquid drainage.

The present invention contemplates plastic pipes or conduits, T-fittings, blind T-fittings, couplers for joining two components together and the like, which are assemblable into a complete drain system.

For a more complete understanding of the present invention reference is made to the following detailed description and accompanying drawing. In the drawing, like reference characters refer to like parts throughout the several views in which:

DESCRIPTION OF THE PREFERRED EMBODIMENTS

Figure 1:
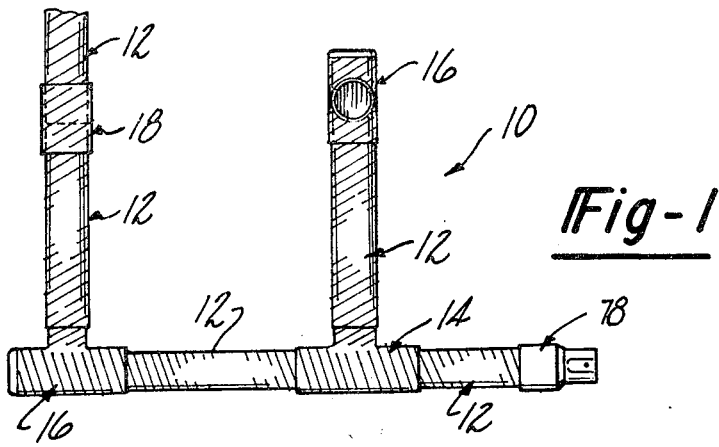
FIG. 1 is a top plan view of a drainage system in accordance with the present invention.

Now with reference to the drawing, and in particular FIG. 1, there is depicted a plastic pipe system, generally indicated at 10, and in accordance herewith.

The system 10 includes components, such as conduits 12, T-fittings 14, blind T-fittings 16, couplers 18, adapters 78 and the like. However, it is to be understood that any system constructed herefrom need not use all of the components hereof nor any set plurality or singularity of components, nor is the present invention to be restricted to the system depicted in FIG. 1. Rather, FIG. 1 merely depicts a typical illustrative system which can be assembled in accordance herewith.

The system 10 is assembled by interengaging the components in a manner described hereinbelow.

Figure 2:
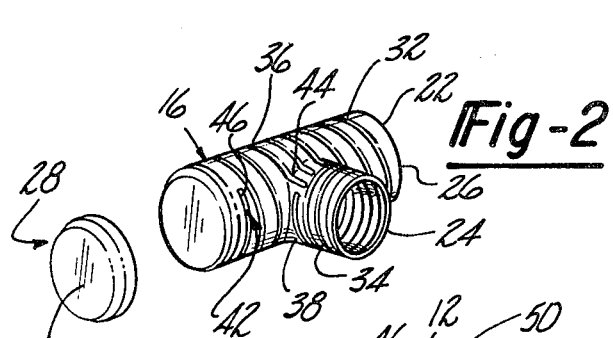
FIG. 2 is a perspective view, partially exploded, of a blind T-fitting in accordance with the present invention.

Referring now to FIG. 2, there is depicted therein a blind T-fitting 16, hereinafter referred to as a blind T for purposes of brevity, in accordance herewith.

The blind T 16 comprises a substantially tubular element or member 22 and intersecting substantially tubular element 24 formed therewith. The element 24 is, preferably, perpendicular to the element 22. The elements 22 and 24, being hollow, are in communication with each other, as shown. The element 22 has a first open end 26 and a closed second end 28. The second end 28 is closed by end cap 30.

Preferably, the elements 22, 24 and the end cap 30 are molded as an integral unit in a manner described subsequently.

Each of the elements 22, 24 of the blind T 16 has a helical thread 32, 34, respectively, formed in their respective peripheral or external surfaces 36, 38. Each of the helical threads, as noted, is formed in their respective peripheral surfaces, and, thus, is downwardly directed towards the interior of the blind T. Each of the threads has at least one root portion having an aperture 42 formed therein and opening into the interior of the blind T 16. The provision of apertures 42 in the root portions of the threads facilitates liquid drainage into the system. However, depending on the needs of any particular system, the apertures may be omitted.

It should be further noted, that the helical thread 32 is substantially circumferentially disposed about the element 22 except at the point of intersection 44 of the element 24. At the point of intersection 44, the thread 32 extends onto the element 24, as shown.

Figure 3:
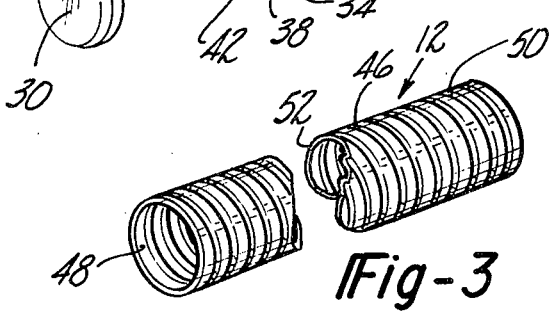
FIG. 3 is a perspective, broken view of a conduit in accordance with the present invention.

Referring now to FIG. 3 there is depicted therein a pipe or conduit 12, as contemplated by the present invention. The conduit 12 comprises a substantially tubular element 46 having an open or hollow interior 48. A helical thread 50 is provided in the peripheral or exterior surface wall 52 of the element 46. The thread 50 is substantially similar to the threads 32, 34 described above. Furthermore, the diameter of the conduit 12 is slightly less than that of the other components of the system 10, to facilitate interengagement.

Figure 4:
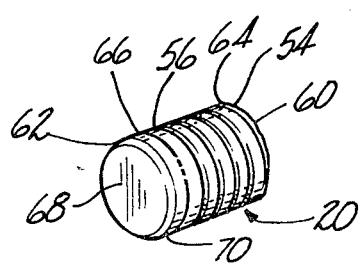
FIG. 4 is a perspective view of an end closure in accordance with the present invention.
Figure 4:

In FIG. 4 there is depicted an end closure 20 for use herein. The end closure 20 comprises a substantially tubular element or member 54 having an open interior. The end closure is used to terminate any branch in the system 10 and as shown in FIG. 1.

The end closure 20 has a diameter slightly greater than that of the conduit 12. The end closure 20 is provided with a helical thread 56. The thread 56 is substantially similar to that hereinbefore described, so that in use it may be coincident therewith in achieving interengagement between it and a conduit.

As shown in FIG. 4, the thread 56 extends along the exterior or peripheral surface 58 of the closure 20, but lies between the terminal points 60, 62 thereof. Thus, there is provided substantially flat or smooth surfaces 64, 66 proximate the terminal points of the closure. The closure also includes an end cap 68 which closes off the end 62 of the closure. The cap 68 also includes a severance line 70 formed on the exterior surface 58 of the closure. The severance line 70 facilitates conversion of the end closure 20 to a coupler 18, as detailed subsequently.

It should be noted that all of the fittings, i.e., the T-fittings, blind T-fittings, end closures and couplings, and collectively referred to as "fittings", are provided with the flat or smooth surfaces proximate their terminal points, as described with respect to the coupler. Thus, the threads are not completely coextensive with their associated components, save for the conduits 12.

Figure 6:
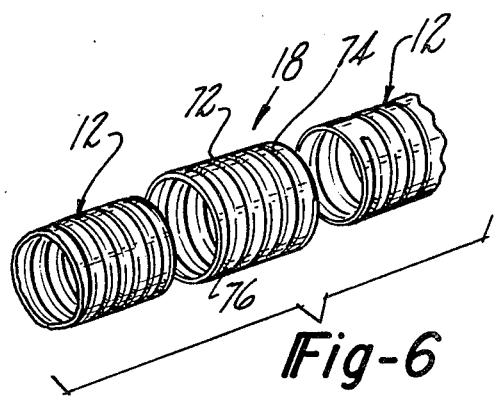
FIG. 6 is an exploded perspective view of a coupler and conduits in accordance with the present invention.

Referring now to FIG. 6 there is shown a coupler 18 disposed between two conduits 12 and which interconnects the two conduits. The coupler 18 comprises a tubular element or member 72. A helical thread 74 is formed in the external or peripheral surface 76 of the coupler in the manner hereinbefore described. Thus, the thread 76 extends along but is not coextensive with the member 72.

The flat or smooth portions of the fittings, as defined, provide structural rigidity thereto.

Figure 5:
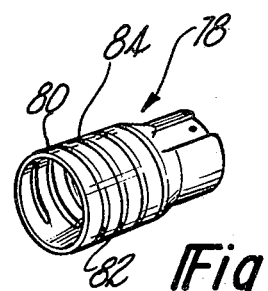
FIG. 5 is a perspective view of an adapter deployable with the present invention.

In FIG. 5, there is depicted an adapter 78 useful in connecting a threaded conduit to the interior of a smooth-walled conduit. The adapter 78 has a first portion 80 with a diameter slightly greater than that of a conduit 12 and is provided with a helical thread 82 in the exterior surface 84 thereof. This adapter is more completely described in copending U.S. Patent Application Ser. No. 118,726, filed Feb. 25, 1971 and entitled "Adapter", now U.S. Pat. No. 3,797,865. Although the adapter does not constitute part of the instant invention its efficacy and advantage in the present system is apparent.

From the preceding it is seen that interengagement of the components is achieved by threadingly connecting the components together. Threaded engagement is facilitated by the slightly greater diameter of the fittings, i.e., the coupler, end closure, T-fitting, blind T-fitting and the like, as compared to the diameter of the conduit.

Threaded interengagement is achieved by first sliding in a translatory mode, the fitting over the conduit, the distance defined by the flat or smooth portion, until contact is made between the thread of the fitting and the thread of the conduit. Then, the fitting and the conduit are rotated in opposite directions to each other to effectuate threaded interengagement. The degree of rotation is of no criticality, except where the components are apertured. In such instance the components are rotated until there is substantial registry between the aperture. It should be noted, in this regard, that the flat or smooth portions of the fittings are so dimensioned that they do not interfere with any apertures in the conduits.

Furthermore, the depth of the threads are such that a sealing effect is achieved upon threaded interengagement, with the conduit always being disposed interiorly of the fitting.

It should also be noted in regard to the present invention that the end closure 20 and coupler 18 are, preferably, of slightly greater diameter than the T-fittings so that a T-fitting can be connected to a conduit with a coupler disposed therebetween, where desired.

As hereinbefore disclosed, the plastic pipe system is particularly adapted for use as a drain tile system. Thus, it is possible to emplace within the apertured threads a filtering means, such as, described in copending U.S. Patent Application Ser. No. 379,659, filed July 16, 1973 and entitled "Filtered Liquid-Conveying Conduit".

The fittings hereof are prepared by molding by any suitable method, such as injection molding, pour in place or the like in a manner well known to the skilled artisan. The conduits and fittings are prepared from any suitable plastic resin, including polyolefins, such as, polyvinylic compounds, e.g., polyvinyl chloride, and the like.

In molding the fittings they are formed as completely closed units. In other words, both ends of the coupler as well as the end closure are formed with both ends closed. As described, with reference to FIG. 4, a severance line is formed proximate the end cap provided on each end of the tubular member. Thus, either end cap or both caps can be removed by cutting it or them off along the severance line. It is, therefore, apparent that the end closure hereof is made by severing one end cap from a closed ended tubular element. Moreover, the coupler hereof is provided by the severance of both end caps. Thus, where desired an end closure can be converted to a coupler by severing the end cap 68 thereof.

Severance can be done by any suitable method, either manually or with automatically controlled mechanical means.

With regard to the T-shaped fittings, they are, also, manufactured with closed ends. A blind T is formed by severing off the closed end of the intersecting element 22 (FIG. 2) and one of the closed ends of the other elements 22 thereof. A completely open T-fitting is manufactured by severing off all of the closed ends or end caps. A blind T can, thus, be converted to an open T by severing the end cap. In manufacturing the T's a severance line is provided proximate the terminal points thereof.

Again, severance can be done by any suitable method, such as by manual cutting or with automatic means.

The severance lines hereinfore discussed are disposed at a predetermined point so that upon severance the remaining flat or smooth portions are non-interfering with any aperture disposed in the root portions of the thread.

To assemble the system 10 hereof, the conduits are connected together in any desired mode by threadingly deploying the proper fitting for the desired purpose. Thus, to connect two conduits together a coupler is employed. To close the end of a conduit, an end closure is used. To connect three conduits together, with one perpendicular to the other two, a T-fitting is used. To close one end of a conduit and to connect another conduit perpendicular thereto a blind T-fitting is used. Thus, a plurality of assemblies are achievable by the practice of the present invention.

Having thus described my invention what is claimed is:

1. A method of manufacturing a plastic ground drainage component comprising the steps of:
   (a) molding a first plastic tubular member having a hollow interior, said first plastic tubular member being formed with a first closed end and a second substantially closed end;
   (b) forming an inwardly directed double-entry helical thread in the exterior and interior surfaces of said first plastic tubular member in at least one portion of said surfaces between said first end and said second end;
   (c) forming circumferential guide lines on the exterior surface of said first plastic tubular member proximate said first end and proximate said second end of said first plastic tubular member;
   (d) forming smooth portions on the exterior and interior surfaces of said first plastic tubular member between each said guide line and the adjacent helically-threaded portion; and
   (e) severing along said circumferential guide line proximate said second end.

2. The method of claim 1 including the steps of:
   (f) forming a second plastic tubular member having its lengthwise axis disposed perpendicular to the lengthwise axis of said first plastic tubular member, and intersecting with said first plastic tubular member substantially at the lengthwise midpoint of said first plastic tubular member;
   (g) forming symmetrical double-entry helical threads in the exterior and interior surfaces of said second plastic tubular member from the outermost end of said second plastic tubular member to the intersection of said first and second plastic tubular members;
   (h) forming said inwardly directed double-entry helical thread in said first tubular plastic member in a first and in a second portion of said first plastic tubular member adjacent said first and second ends thereof; and
   (i) forming inwardly directed ribs on the exterior and interior surfaces of said first plastic tubular member between said first and second portions of inwardly directed double-entry helical thread, said inwardly directed ribs extending onto a portion of said second plastic tubular member.

3. The method of claim 1 which further comprises the step of:
   (j) severing along the circumferential guide line proximate said first end.

* * * * *